US008330591B2

(12) United States Patent
Ziehr

(10) Patent No.: US 8,330,591 B2
(45) Date of Patent: Dec. 11, 2012

(54) METHOD AND SYSTEM FOR ADJUSTING VEHICULAR COMPONENTS BASED ON SUN POSITION

(75) Inventor: Lawrence P. Ziehr, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1581 days.

(21) Appl. No.: 11/464,883

(22) Filed: Aug. 16, 2006

(65) Prior Publication Data

US 2008/0046151 A1    Feb. 21, 2008

(51) Int. Cl.
*B60R 25/10* (2006.01)
*F24F 7/00* (2006.01)
*G05B 13/02* (2006.01)
*G06F 3/00* (2006.01)
*H02K 7/10* (2006.01)

(52) U.S. Cl. ............ 340/426.26; 340/426.28; 340/461; 340/425.5; 236/49.3; 700/31; 715/788; 715/790; 318/265

(58) Field of Classification Search .................. 340/461, 340/539.22, 572.1; 290/1; 323/906; 320/101; 60/659, 641.11, 641.12; 236/1 B; 165/203; 62/133

See application file for complete search history.

(56) References Cited

U.S. PATENT DOCUMENTS

| | | | | |
|---|---|---|---|---|
| 5,296,868 A * | 3/1994 | Itami et al. | | 345/7 |
| 5,553,661 A * | 9/1996 | Beyerlein et al. | | 165/203 |
| 5,832,990 A * | 11/1998 | Eisenhour | | 165/202 |
| 5,969,870 A * | 10/1999 | Jain et al. | | 359/603 |
| 6,145,118 A * | 11/2000 | Tomita | | 716/21 |
| 6,732,938 B1 * | 5/2004 | Wang et al. | | 236/49.3 |
| 7,573,377 B2 * | 8/2009 | Kageyama et al. | | 340/461 |
| 2002/0059022 A1 | 5/2002 | Breed et al. | | 701/45 |
| 2004/0066376 A1 * | 4/2004 | Donath et al. | | 345/169 |
| 2004/0149426 A1 * | 8/2004 | McBroom et al. | | 165/202 |
| 2005/0057351 A1 * | 3/2005 | Adams et al. | | 340/461 |
| 2005/0120570 A1 * | 6/2005 | Bastian | | 33/268 |
| 2006/0207730 A1 * | 9/2006 | Berman et al. | | 160/310 |
| 2007/0033828 A1 * | 2/2007 | Hartkop et al. | | 34/443 |

* cited by examiner

*Primary Examiner* — Jennifer Mehmood
*Assistant Examiner* — Fekadeselassie Girma
(74) *Attorney, Agent, or Firm* — Ingrassia Fisher & Lorenz, P.C.

(57) ABSTRACT

A system for adjusting components in an automobile to compensate for impinging sunlight includes a solar data generator configured to generate solar data concerning a current location, heading, date and time of a vehicle. A solar data calculator is coupled to the solar data generator and configured to receive solar data and determine a vehicle component affected by impinging sunlight. A body control manager is coupled to the solar data calculator and operable to control the vehicle component to compensate for impinging sunlight.

20 Claims, 5 Drawing Sheets

METHOD AND SYSTEM FOR ADJUSTING VEHICULAR COMPONENTS BASED ON SUN POSITION

TECHNICAL FIELD

The present invention relates to the field of vehicular components, and more particularly to a method and system for adjusting vehicular components based on sun position.

BACKGROUND OF THE INVENTION

Most drivers have experienced the effects that sun light can have on a driver or occupant of the vehicle at a certain time of the day. For example, sunlight can shine into an automobile and detrimentally affect the visibility of electronic displays, LCD panels used for navigation and entertainment, and mirrors used by an operator of the vehicle. The suns rays impinging upon vehicular components can, at best be an annoyance to the driver and at worst, be a serious safety hazard.

For example, as can be seen in FIG. 1, which is a side view of a vehicle 104, the sun rays 102 from the sun 100 can impinge on the vehicle 104. As the earth rotates, the position of the sun 100 relative to the vehicle 104 changes and the sun rays 102 impinge on different components in the vehicle 104. FIG. 2 is a top view of the vehicle 104 showing potentially different sun 100 positions around the vehicle 104. The position of the sun 100 relative to the vehicle 104 can vary due to the heading of the vehicle 104 and the current position of the sun 100 at the particular location and time. As the position of the sun 100 changes, the vehicle components that can be detrimentally affected by the sun rays 102 can also change. Additionally, different vehicles 104 have different physical configurations, such as window locations, body frame member locations, location of different interior components, and the like. Therefore, the position of the sun 100 relative to the vehicle 104 can affect vehicular components in different ways, depending on the design of the vehicle 104.

Currently, the solution to this problem is fairly limited. Mirrors, LCD panels, and the brightness of electronic displays can be manually adjusted. While automatic dimming of electronic displays has been introduced, these systems work to change the brightness of an electronic display from a first level to a second level based on whether it is day or night.

Accordingly, it is desired to provide a method and system for adjusting vehicular components due to sun position. Furthermore, the desirable features and characteristics of the present invention will be apparent from the subsequent detailed description and the appended claims, taken in conjunction with the accompanying drawings and the foregoing technical field and background.

SUMMARY OF THE INVENTION

In one embodiment of the present invention, a method to adjust components in a vehicle affected by impinging sunrays is disclosed. In a first step, solar data is determined. Next, the sun position information is determined from solar data. Then, a vehicular component affected by sun position is determined. Finally, the vehicular component is adjusted.

In another embodiment of the present invention, a device for adjusting components in a vehicle affected by impinging sunrays is disclosed. The device includes a solar data calculator configured to receive solar data and determine a vehicle component affected by impinging sunlight. A body control manager is coupled to the solar data calculator and can control the vehicle component to compensate for impinging sunlight.

In another embodiment, a system for adjusting components in an automobile to compensate for impinging sunlight is disclosed. The system includes a solar data generator configured to generate solar data concerning a current location, heading, date and time of a vehicle. A solar data calculator is coupled to the solar data generator and configured to receive solar data and determine a vehicle component affected by impinging sunlight. A body control manager is coupled to the solar data calculator and operable to control the vehicle component to compensate for impinging sunlight.

DESCRIPTION OF THE DRAWINGS

The present invention will hereinafter be described in conjunction with the following drawing figures, wherein like numerals denote like elements, and.

DESCRIPTION OF AN EXEMPLARY EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
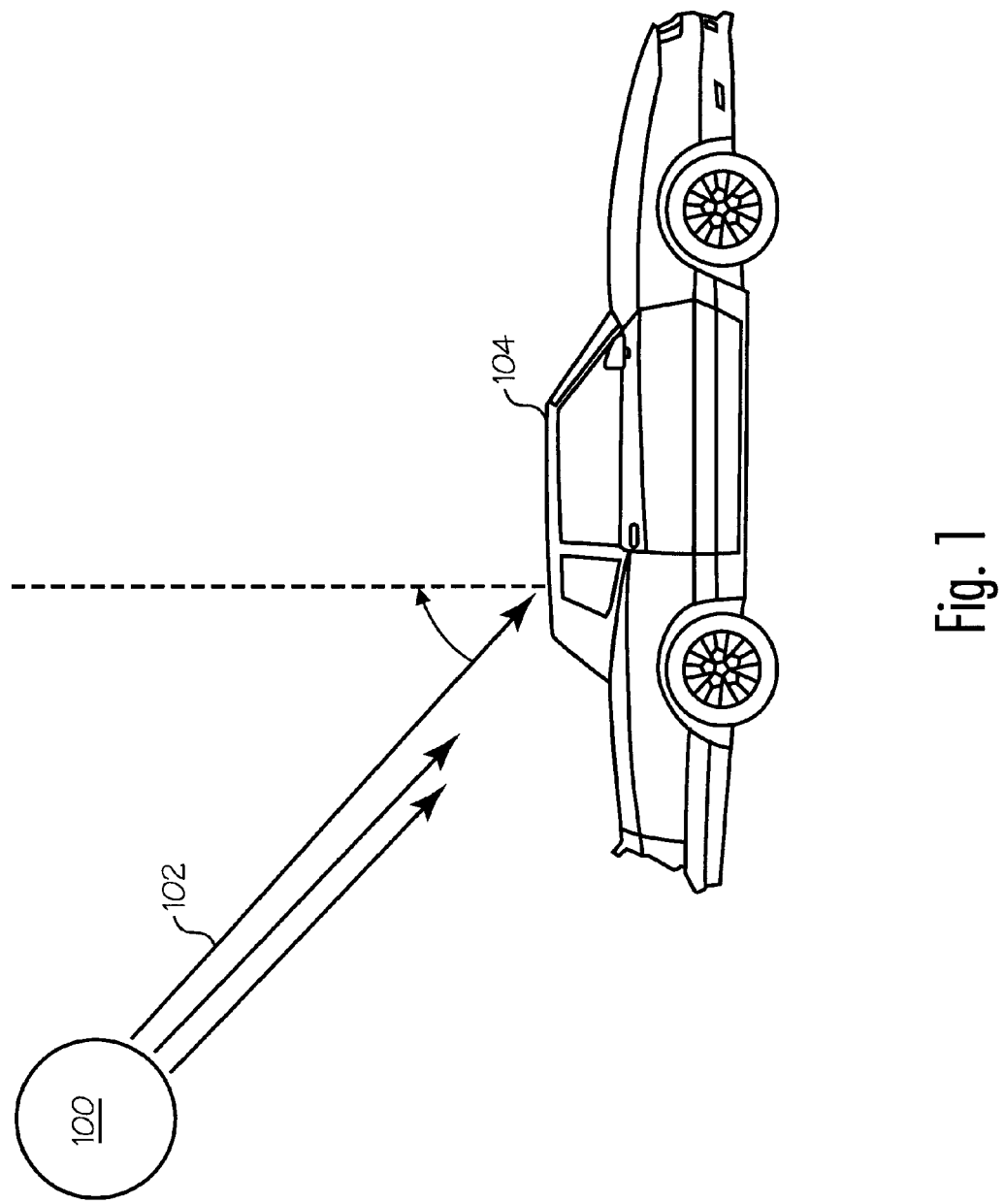
FIG. 1 is a side view diagram of a vehicle and the sun position relative to the vehicle in accordance with an exemplary embodiment of the present invention.
Figure 2:
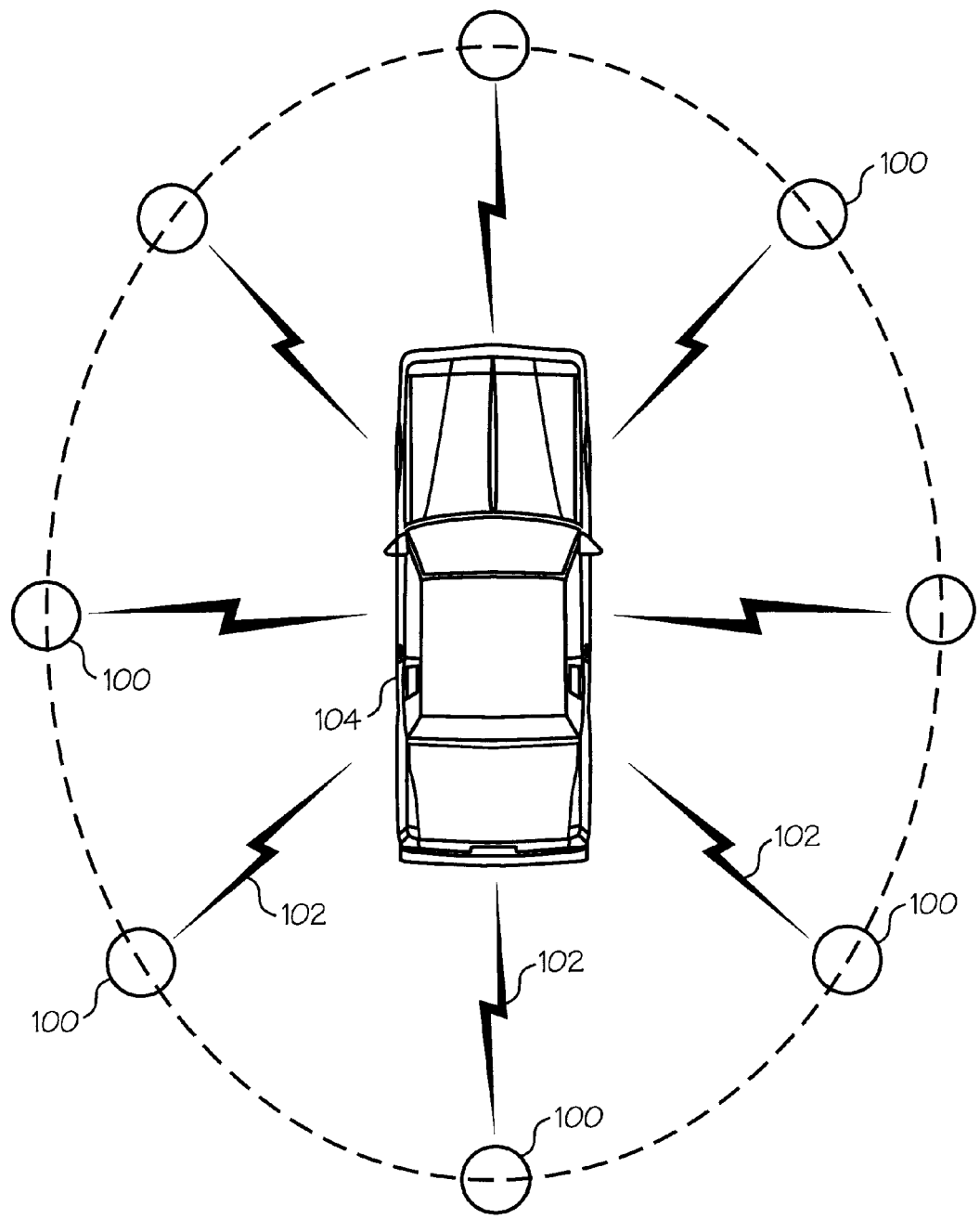
FIG. 2 is a top view diagram of a vehicle and the sun position relative to the vehicle in accordance with an exemplary embodiment of the present invention.
Figure 3:
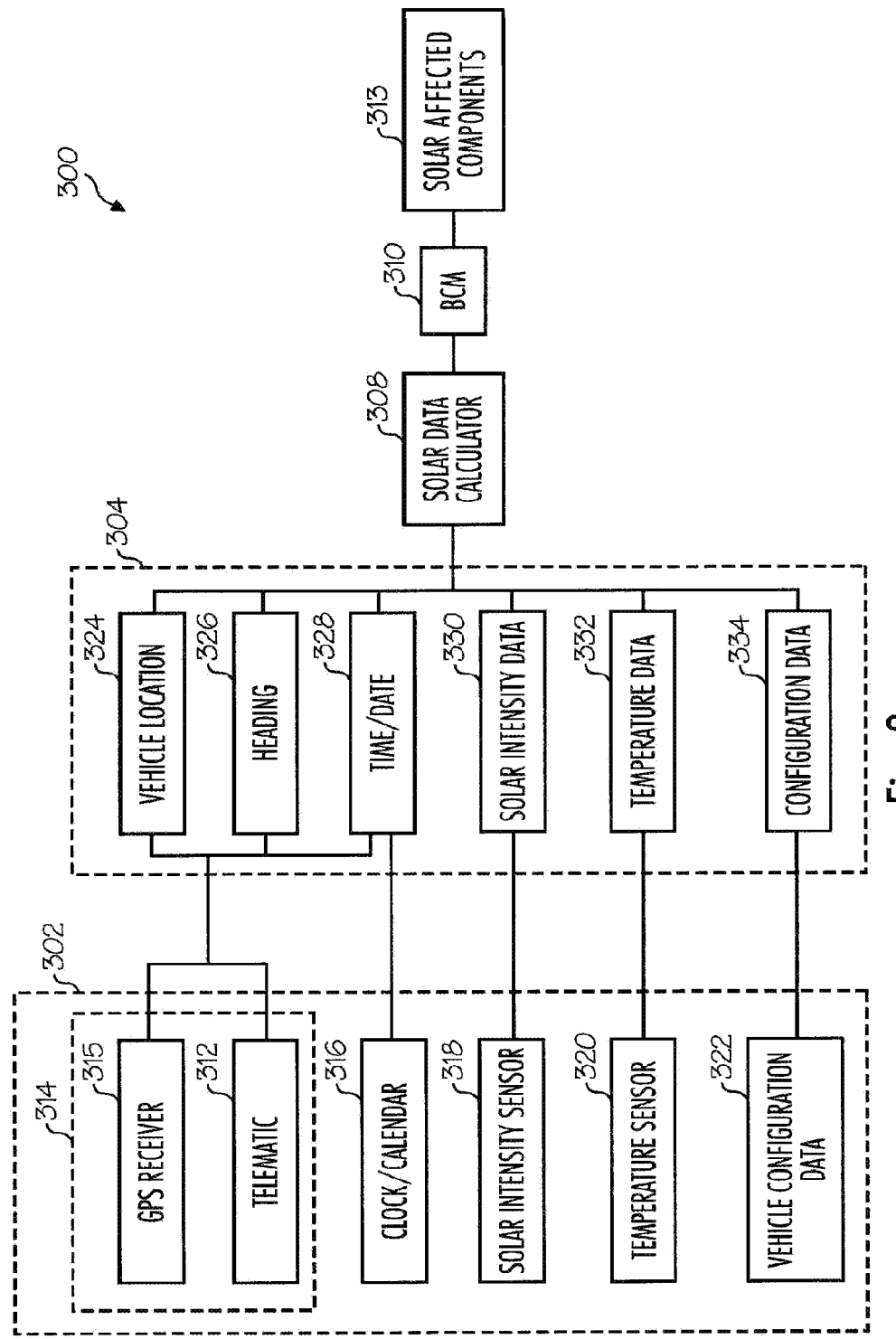
FIG. 3 is a block diagram of a solar adjustment system in accordance with an exemplary embodiment of the present invention.

FIG. 3 is a block diagram of an exemplary embodiment of a solar adjustment system 300. Solar adjustment system 300 comprises a solar data generator 302 coupled to a solar data calculator 308. Solar data calculator 308 couples to body control manager (BCM) 310, which in turn couples to solar affected components 313.

Solar data generator 302 can be any device configured to generate solar data 304 for use by the solar data calculator 308 to determine sun location with respect to a vehicle. In one exemplary embodiment, solar data generator 302 comprises a location data source 314, a clock/calendar 316, a sun intensity sensor 318, a temperature sensor 320 and a vehicle configuration source 322. The solar data can include vehicle location 324, vehicle heading 326, time/date data 328, solar intensity data 330, temperature data 332 and vehicle configuration data 334.

Location data source 314 is any device that can receive, produce and/or generate location data regarding the location of a vehicle in or on which the location data source 314 is mounted. The location data can then be used by solar data calculator 308, as will be discussed in greater detail below, to determine precision solar data.

In one embodiment, location data source 314 comprises a telematic system 312. Telematic system 312 can be an in-vehicular system that determines data such as location data from one or more vehicles or external sources. In one exemplary embodiment, telematic system 312 can obtain data including the vehicle location 324 (such as the latitude/longitude of the vehicle), and vehicle heading 326, which may include the current vehicle heading as compared to an absolute heading or a heading as referenced to true north. Telematic system 312 may also provide time/date data 328 in the form of the current date and current time.

In another exemplary embodiment, location data source 314 includes a GPS receiver 315 mounted on the vehicle. GPS receivers 315 are known in the art and are used in vehicle navigation systems. In one exemplary embodiment, the GPS receiver 315 can receive/generate vehicle location 324 in the form of the latitude/longitude location of the vehicle, and vehicle heading 326 in the form of a compass direction heading and the time/date data 328.

Clock/calendar 316 is any device that can receive or generate time/date data 328 regarding the current time and current date. As discussed previously, date and time information can be generated by GPS receiver 315 or telematic system 312 can include the capability of providing time and date information. Clock/calendar 316 can provide the time and date information to solar data calculator 308.

Solar intensity sensor 318 provides solar data in the form of solar intensity data 330 to the solar data calculator 308. In one exemplary embodiment, solar intensity sensor 318 is a sensor mounted on the vehicle, such as on the dashboard.

Temperature sensor 320 provides temperature data 332 regarding the temperature as related to the solar energy received at the sensor. In one embodiment, temperature sensor 320 uses one or more thermometers mounted on a vehicle. The data from the temperature sensor 320 can be used to generate a solar intensity value utilizing an energy balance equation. This derived solar intensity value can be useful when the solar intensity is difficult to measure accurately using the solar intensity sensor 318, such as when the solar intensity sensor 318 is blocked temporarily from receiving an accurate measure of sunlight, e.g., when the solar intensity filter falls within a shadow caused by a pillar of the vehicle 104.

In practice, temperature sensor 320 may be realized as a thermistor, which can be mounted on the instrument panel, on the windshield, on the rear window, on the roof of the vehicle, on an external antenna of the vehicle, or the like. Temperature sensor 320 may provide sensor data in a suitable format that can be understood and processed by the solar data calculator 308. As described in more detail below, the solar data calculator can processes the temperature data 332 obtained from temperature sensor 320 and performs an energy balance to estimate the actual solar intensity at the measurement location. In other words, solar adjustment system 300 may be configured to derive the solar intensity information using temperature data rather than actual solar data.

In one exemplary embodiment, the temperature sensor 320 measures the localized temperature at a measurement location on an instrument panel. An energy balance equation estimates solar intensity at this measurement location by considering the radiation exchange between the windshield and instrument panel, the transmitted solar energy that passes through windshield, convection from the instrument panel into the vehicle interior, and energy stored in temperature sensor 320 itself. Suitable energy balance relationships differ for different environments and the derivation of such relationships are known in the art.

Vehicular configuration source 322 is a source of stored vehicular configuration data 334, and can be any information regarding a particular vehicle 104, including data indicative of the vehicle's design and physical layout. The vehicular configuration data 334 may include the vehicle make and model, the vehicle identification number, the location of light blocking infrastructures, such as structural pillars, glass types and composition, and the presence and location of solar affected components 313. Providing vehicular configuration data 334 allows for an accurate determination of solar affected components 313 since the components location and the sun's affect on them will vary between different makes and models of automobiles.

Solar data calculator 308 is any device that can receive solar data 304 from one or more solar data generators 302 and determine the position of the sun relative to the vehicle in which the system is mounted. For example, solar position can be determined from the vehicle location and the current time and date. Additionally, based on the position of the sun, solar data calculator 308 can determine which of the potentially solar-affected components 313 are actually affected by the sun at that time, vehicle location, and vehicle health. The vehicle heading 326 and the vehicular configuration data 334 can be used to determine the solar affected components 313.

In one embodiment, solar data calculator 308 can be implemented as a general purpose processor such as a microprocessor and the like; however, any computer programmed or implemented in hardware that generates data indicating which solar affected component 313 are affected by the sun can be used.

Vehicle Body Control Module (BCM) 310 is coupled to the solar affected components 313 and can determine the current status of the solar affected components 313 in terms of the current position and operating state of the solar affected components 313. In the exemplary embodiment of the present invention, each of the solar affected components 313 can be automatically adjusted. The BCM 310 controls the adjustment of each of the solar-affected components 113 using commands sent from the BCM 110 to the controller of solar affected components 313. BCM 310 can receive data from the solar data calculator 308, such as the solar-affected components 313. The BCM 310 can then determine an appropriate adjustment for the component and send that command to the particular components.

While solar data calculator 308 and BCM 310 are shown as separate components, their functionality can be combined as a single component, or the calculations done by the solar data calculator 308 and the BCM 310 can be distributed differently then described previously. For example, the solar data calculator 308 could determine the component adjustments.

Figure 4:
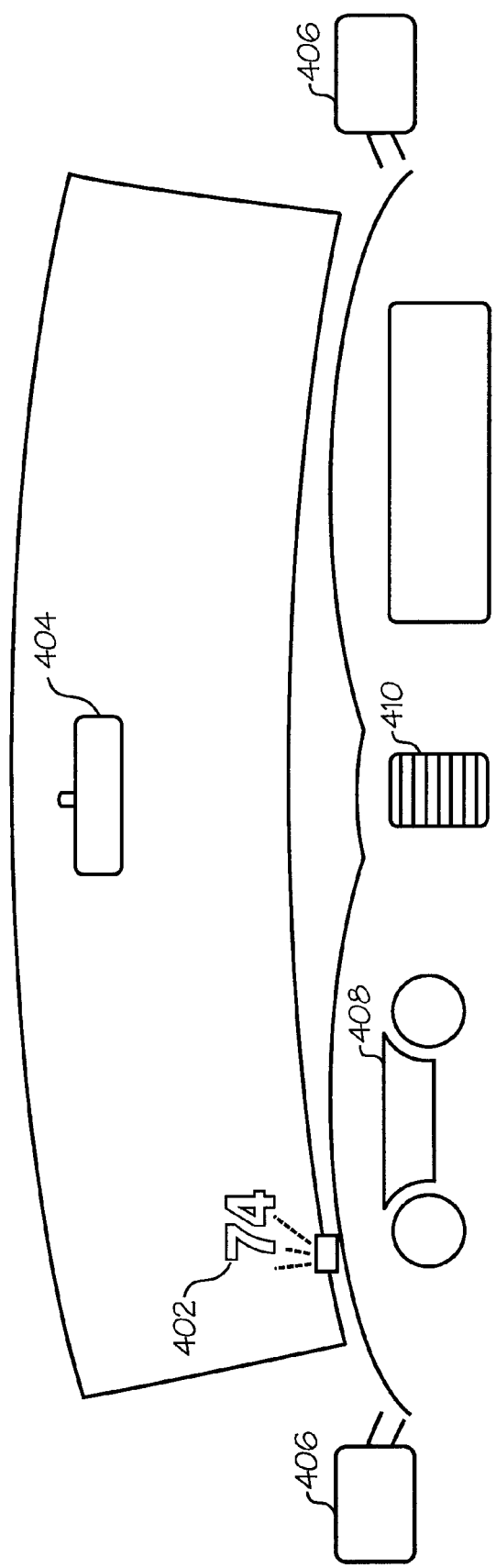
FIG. 4 is a view of solar affected components in accordance with an exemplary embodiment of the present invention.

Solar affected components 313 may include any vehicular components that can be affected by sunlight in such a way as to cause inconvenience to the vehicle operator or passengers. In one exemplary embodiment, as illustrated in FIG. 4, solar affected components comprise a heads-up display unit 402, rear view mirror 404, side mirrors 406, electronic driver information center 408, and navigational display panel 410.

BCM 310 can control the intensity (brightness) of the heads-up display unit 402, the electronic driver's information center 408, and the navigational display panel 410 to compensate for the position and intensity of the sun. For example, the brightness of the electronic driver information center 408 can be adjusted upwards as the intensity of the sunlight increases on that component. The BCM 310 can also adjust the orientation of rear view mirror 404, side mirrors 406, and navigational display panel 410 to avoid the deleterious affect of the incidental sunlight. Currently, components such as these have normal operated powered adjustment. In an exemplary embodiment of the present invention, automatic controllers (not pictured) can receive various commands from the BCM 110 to perform necessary adjustments.

The various adjustments to solar affected components 313 described above are for exemplary purposes only. Other types of adjustments to compensate for solar effects are within the scope of the present invention. For example, the location on the vehicle where heads-up display 402 information is displayed can be adjusted.

The solar affected components 313 discussed above are examples of solar affected components. Any other components in the vehicle that can be affected by solar position and/or intensity can be a solar affected component that can be compensated for by the present invention.

Figure 5:
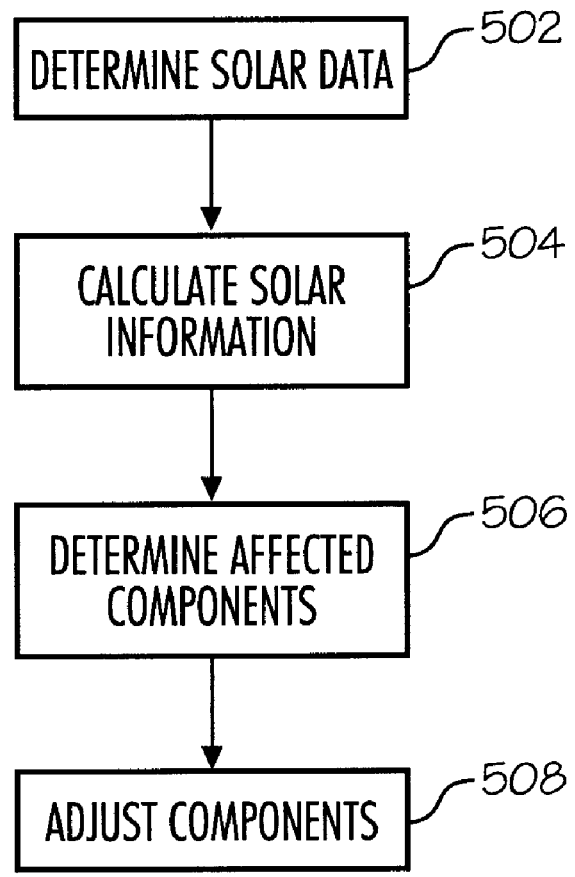
FIG. 5 is a flowchart illustrating a method for compensating for solar effect on vehicular components in accordance with an exemplary embodiment of the present invention.

FIG. 5 is a flowchart illustrating an exemplary method for compensating for solar effect on vehicular components. In a first step, step 502, solar data is determined. As discussed above, this data can include the current time, date, location of the vehicle, the vehicle heading, the vehicle configuration, the solar intensity and any other needed data.

Next, in step 504, the precise solar information can be calculated. The precise solar information contains information regarding the precise location of the sun in regards to vehicular components. In one exemplary embodiment, the sun azimuth angle and the sun zenith angle are calculated from the solar data.

In step 506, the sun position determined in step 504 can be used in conjunction with the vehicle configuration data 334 to determine vehicular components that are affected by the sun. Vehicular configuration data 334 can be used to determine if a vehicular component will be in the path of the sun rays. Also, the vehicular configuration data 334 can be used to determine if any vehicular structure blocks the sun rays which could eliminate the need for component adjustment.

In step 508, after it is determined which vehicular components are affected by the sun, the components can be adjusted. The exact method to adjust the components can vary depending on the component. For example, the intensity of the electronic displays can be adjusted depending on solar effects. Components that are currently adjustable, such as side mirrors can be coupled to servers or other control devices (not shown). The control devices can then receive signals to adjust the component.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A method for adjusting components in a vehicle when the components are visually affected by impinging sun rays comprising:
 calculating a sun position from GPS information;
 determining a visual effect on one of the components based upon the sun position and upon vehicular configuration data from a vehicular data source, wherein the vehicular configuration data identifies a vehicle window location, and a location of the components; and
 adjusting the one of the components in response to the determined visual effect.

2. The method of claim 1 wherein the GPS information comprises the vehicle's location, heading and a current date and time.

3. The method of claim 1 further comprising determining solar data from a solar intensity sensor.

4. The method of claim 1 further comprising determining solar intensity data derived using a thermometer and an energy balance equation.

5. The method of claim 2 wherein the step of calculating the sun position further comprises calculating the sun azimuth and the sun zenith from the vehicle's location, heading and the current date and time.

6. The method of claim 1 wherein the vehicular configuration data identifies a location of a vehicle structure, and wherein the step of determining the visual effect on the one of the components by the sun further comprises using the vehicular configuration data and the sun position information to determine if the vehicle structure prevents the impinging sun rays from visually affecting the one of the components.

7. The method of claim 1 wherein the step of adjusting the affected one of the components further comprises changing a brightness of an electronic display.

8. The method of claim 1 wherein the step of adjusting the one of the components further comprises changing an alignment of the one of the components.

9. The method of claim 1 further comprising:
 deriving solar intensity data from a solar intensity sensor;
 wherein the determining the visual effect on one of the components is based upon the solar intensity data.

10. A device for adjusting components in a vehicle visually affected by impinging sun rays comprising:
 a solar data calculator configured to receive solar data and determine which of the components are visually affected by impinging sunlight, wherein the solar data calculator is configured to determine which of the components are visually affected by the impinging sunlight by using vehicular configuration data including a vehicle window location, and a location of one of the components; and
 a body control manager coupled to the solar data calculator and operable to control the components visually affected by the impinging sunlight to compensate for the impinging sunlight.

11. The device of claim 10 wherein the solar data comprises the vehicle's location, heading, and the current date and time.

12. The device of claim 11 wherein the vehicle's location, heading, and the current date and time are determined using a GPS device.

13. The device of claim 10 wherein the solar data calculator is configured to calculate solar data comprising the sun's azimuth and zenith from the vehicle's location, heading and the current date and time.

14. The device of claim 10 wherein the body control manager is configured to change an alignment of the components visually affected by the impinging sunlight to adjust for the impinging sunlight.

15. The device of claim 10 wherein the vehicular configuration data identifies a location of a vehicle structure, and wherein the solar data calculator is configured to determine which of the components are visually affected by the sun by using the vehicular configuration data and the sun position information to determine if the vehicle structure prevents the impinging sun rays from visually affecting one of the components.

16. A system for adjusting components in an automobile to compensate for impinging sunlight comprising:

a solar data generator configured to generate solar data concerning the automobile's current location, heading, date and time;

a solar data calculator coupled to the solar data generator and configured to receive solar data and determine an automotive component visually affected by the impinging sunlight using vehicular configuration data that identifies vehicle window locations, automotive structures and component locations of the components; and a body control manager coupled to the solar data calculator and operable to control the automotive component to compensate for the impinging sunlight.

17. The system of claim 16 wherein the solar data calculator is further configured to:

calculate a current sun position from the solar data;

determine whether the automotive structures block the impinging sunlight before the impinging sunlight reaches the automotive component visually affected by the impinging sunlight.

18. The method of claim 1 wherein the determining the visual effect on the one of the components comprises determining when an alignment occurs with the sun position, the vehicle window, and the one of the components.

19. The system of claim 16 wherein the components in the automobile comprises an electronic display having an intensity setting, and wherein the body control manager compensates for the impinging sunlight by adjusting the intensity setting of the electronic display.

20. The system of claim 16 wherein the components in the automobile comprises a rearview mirror having a rearview mirror position, and a side mirror having a side mirror position, and wherein the body control manager compensates for the impinging sunlight by adjusting the rearview mirror position and the side mirror position.

* * * * *